No. 671,594. Patented Apr. 9, 1901.
W. L. HARVEY.
GLASS BATH TUB.
(Application filed Sept. 1, 1900.)
(No Model.)
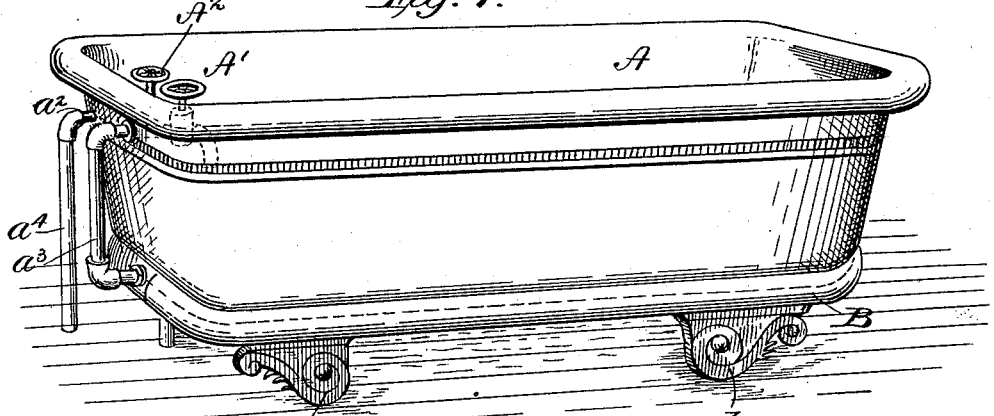
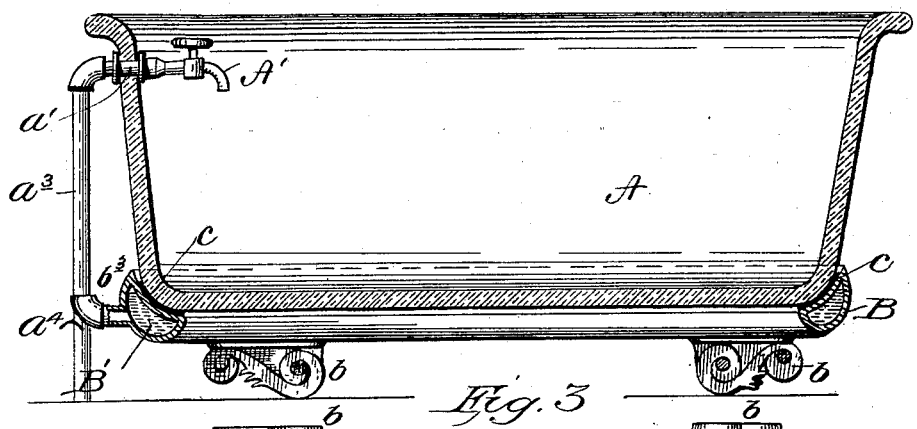
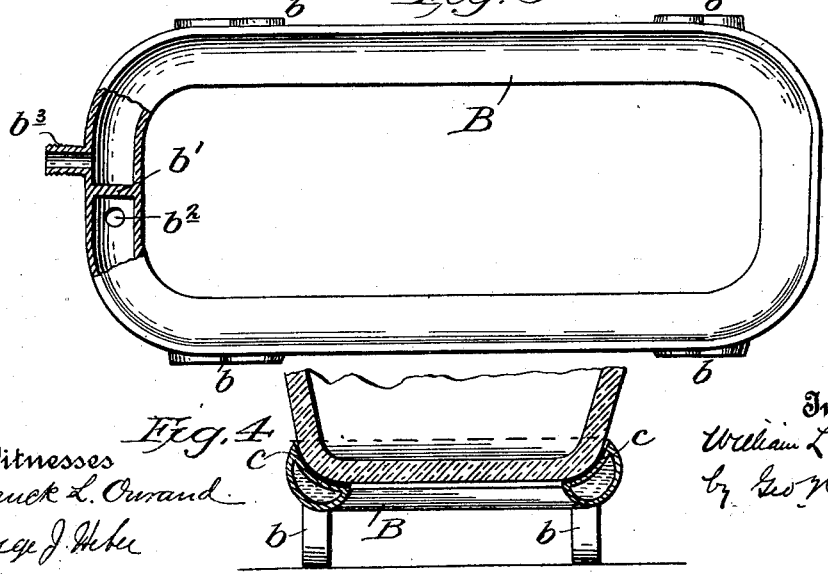
Witnesses
Franck L. Ourand
George J. Heber
Inventor
William L. Harvey
by Geo. H. Evans
Attorney
THE NORRIS PETERS CO., PHOTO-LITHO., WASHINGTON, D. C.

UNITED STATES PATENT OFFICE.

WILLIAM L. HARVEY, OF GOSFORD, PENNSYLVANIA.

GLASS BATH-TUB.

SPECIFICATION forming part of Letters Patent No. 671,594, dated April 9, 1901.

Application filed September 1, 1900. Serial No. 28,802. (No model.)

*To all whom it may concern:*

Be it known that I, WILLIAM L. HARVEY, a citizen of the United States, residing at Gosford, Armstrong county, Pennsylvania, have invented certain new and useful Improvements in Glass Bath-Tubs, of which the following is a specification.

My invention relates to bath-tubs and like articles formed of glass; and the object of the invention is to provide means for preventing the glass from cracking or crazing when the hot water is admitted.

Glass bath-tubs have not gone into use so far as I am aware, notwithstanding their many advantages, and this is due to the fact that glass is liable to crack when the hot water is turned into the tub or like vessel.

The above object I accomplish by the mechanism shown in the accompanying drawings, in which—

Figure 1 is a perspective view of a glass bath-tub having my improvements applied. Fig. 2 is a longitudinal vertical section. Fig. 3 is a plan, partly in section, of the combined support and heater. Fig. 4 is a detail cross-sectional view.

A represents a glass bath-tub, which may be of any suitable form.

$A'$ $A^2$ represent the hot and cold water spigots, which are connected to the short pipe-sections $a'$ $a^2$, extending through two apertures in one end of the tub.

B represents the bath-tub support and heater, provided with suitable legs or feet $b$. This combined support and heater B is cast or otherwise formed in open oblong form and is hollow, so as to form a hot-water passage $B'$. This passage is divided at one end of the support, as shown at $b'$, and the hot-water inlet $b^2$ is formed at one side of this partition $b'$ and the hot-water outlet $b^3$ at the other side. The hot-water inlet $b^2$ is connected, as usual, to the hot-water service-pipe, and the outlet $b^3$ is connected to the spigot-section $a'$ by a vertical length of pipe $a^3$. The cold-water pipe-section $a^2$ is connected, as usual, to the cold-water service-pipe by a vertical pipe-section $a^4$.

The support B is concaved around its inner side, so as to correspond with the convexity of the tub-bottom and receive the same snugly. In any event the tub and its support are correspondingly shaped to make a snug and neat fit, and a strip of some yielding material C is preferably interposed between their contacting faces.

The operation is as follows: The hot-water spigot being turned on, the hot water will flow into and around the passage $B'$, thereby heating the support B, which in turn will gradually heat the tub, so that by the time the hot water leaves the spigot or faucet $A'$ the tub will have been warmed sufficiently to prevent it from cracking or crazing by the expansion due to the entrance of the hot water.

It is obvious that the support B may be of any desired contour so long as it will support a tub out of contact with the water and serve as a conductor for the hot water from the service-pipe to the faucet connection.

Moreover, the support will be useful in enamel-lined tubs in order to prevent the enamel from cracking or crazing.

What I claim is—

1. The combination with a glass bath tub or vessel, of a combined support and heater comprising a hollow closed chamber on which the tub rests, having a hot-water passage adapted at one end for connection with a hot-water service-pipe and at the other end connected to the hot-water faucet of the tub, substantially as described.

2. A support for bath-tubs comprising a closed hollow or tubular frame, provided at one end of its interior passage with a hot-water inlet, and at the opposite end thereof with a hot-water outlet adapted for connection with the faucet of a bath tub or vessel, substantially as described.

3. A support for bath-tubs comprising a closed hollow or tubular oblong frame concaved around its inner margin to receive the tub or vessel; the internal passage being divided by a transverse partition and provided at opposite sides thereof with an inlet and outlet for the hot-water supply for the tub, substantially as described.

In testimony whereof I affix my signature in presence of two witnesses.

WILLIAM L. HARVEY.

Witnesses:
M. V. THOMPSON,
GRACE P. BRERETON.